US008423963B2

(12) United States Patent
Garbers et al.

(10) Patent No.: US 8,423,963 B2
(45) Date of Patent: Apr. 16, 2013

(54) COMPUTER IMPLEMENTED API MANAGEMENT MECHANISM FOR GENERATING UPGRADE RISK LEVEL HANDLING

(75) Inventors: Benjamin R. Garbers, Onalaska, WI (US); Brian David McManus, Rochester, MN (US); Dale Arthur Peterson, Rochester, MN (US); Andrew Thomas Thorstensen, Rochester, MN (US)

(73) Assignee: International Buysiness Machines Corporation, Armonk, NY (US)

( * ) Notice: Subject to any disclaimer, the term of this patent is extended or adjusted under 35 U.S.C. 154(b) by 1070 days.

(21) Appl. No.: 12/402,826

(22) Filed: Mar. 12, 2009

(65) Prior Publication Data
US 2010/0235823 A1 Sep. 16, 2010

(51) Int. Cl.
*G06F 9/44* (2006.01)
(52) U.S. Cl.
USPC ............................ 717/125; 717/124; 717/170
(58) Field of Classification Search ........................ None
See application file for complete search history.

(56) References Cited

U.S. PATENT DOCUMENTS

| | | | | |
|---|---|---|---|---|
| 5,701,408 | A * | 12/1997 | Cornell et al. | 714/38.1 |
| 6,298,353 | B1 * | 10/2001 | Apte | 1/1 |
| 6,591,417 | B1 * | 7/2003 | Strysniewicz et al. | 717/168 |
| 6,651,186 | B1 * | 11/2003 | Schwabe | 714/38.14 |
| 6,986,132 | B1 * | 1/2006 | Schwabe | 717/168 |
| 7,069,474 | B2 * | 6/2006 | Atallah et al. | 714/39 |
| 7,080,356 | B2 * | 7/2006 | Atallah et al. | 717/124 |
| 7,191,435 | B2 * | 3/2007 | Lau et al. | 717/168 |
| 7,231,635 | B2 * | 6/2007 | Schwabe | 717/126 |
| 7,546,595 | B1 * | 6/2009 | Wickham et al. | 717/168 |
| 7,600,219 | B2 * | 10/2009 | Tsantilis | 717/122 |
| 7,636,172 | B2 * | 12/2009 | Akiyoshi et al. | 358/1.13 |
| 7,716,647 | B2 * | 5/2010 | Loh et al. | 717/127 |
| 7,721,276 | B2 * | 5/2010 | Lwo | 717/166 |
| 7,814,465 | B2 * | 10/2010 | Liu | 717/126 |
| 8,141,059 | B2 * | 3/2012 | Ding et al. | 717/133 |
| 2003/0229890 | A1 * | 12/2003 | Lau et al. | 717/168 |

(Continued)

OTHER PUBLICATIONS

Sydow, D.P., "Carbon: Getting Ready for Mac OS X," MacTech [online], vol. 15, No. 1, 1999 [retrieved Dec. 3, 2012], Retrieved from Internet: <http://www.mactech.com/articles/mactech/Vol.15/15.01/Jan99GettingStarted/index.html>, pp. 1-7.*

(Continued)

*Primary Examiner* — Insun Kang
*Assistant Examiner* — Todd Aguilera
(74) *Attorney, Agent, or Firm* — Matthew J. Bussan

(57) ABSTRACT

The present invention monitors usage of an operating system at an application program interface ("API") level and monitors changes in API functionality associated with an upcoming release to manage the version change process. A computer system is configured to track a collection of API functions associated with a first version operating system currently installed and to record the subset of API functions that have been called by applications during operation of the first version operating system. The computer system is further configured to manage the subset of API functions and generate a comparison between the subset and a list of API functions that have changed between a second version and the first version operating system. Finally, the computer system is configured to report the result of the comparison back to the user.

22 Claims, 6 Drawing Sheets

U.S. PATENT DOCUMENTS

| | | | |
|---|---|---|---|
| 2007/0033635 A1* | 2/2007 | Hirsave et al. | 726/1 |
| 2007/0168957 A1* | 7/2007 | Li et al. | 717/120 |
| 2007/0180441 A1* | 8/2007 | Ding et al. | 717/163 |
| 2008/0134156 A1* | 6/2008 | Osminer et al. | 717/140 |
| 2009/0037883 A1* | 2/2009 | Garbers et al. | 717/125 |
| 2011/0302564 A1* | 12/2011 | Byers et al. | 717/146 |

OTHER PUBLICATIONS

Anonymous, "The Solaris ABI and ABI Tools" [online], 2001 [retrieved Dec. 3, 2012], Retrieved from Internet: <http://192.9.172.90/software/solaris/programs/abi/documentation/solaris-abi.pdf>, pp. 1-11.*

* cited by examiner

API Comparison Report 115

API Overlap Subset 220

○ Sort By API Function    ● Sort By Software App

| Software App | API Function | Freq # |
|---|---|---|
| Software Application A ▶ | API Function X | L |
| | API Function Y | M |
| | API Function Z | N |
| Software Application B ▶ | API Function M | O |
| | API Function N | P |
| | API Function Z | Q |
| Software Application C ▶ | API Function X | R |
| | API Function M | S |

COMPUTER IMPLEMENTED API MANAGEMENT MECHANISM FOR GENERATING UPGRADE RISK LEVEL HANDLING

BACKGROUND OF THE INVENTION

1. Field of the Invention

This invention relates generally to the software version change process. In particular, this invention provides for a version change process that analyzes prior operating system and software application usage.

2. Description of the Related Art

It is not uncommon for software customers to wait years after an operating system has been released before upgrading to a subsequent release. Sometimes, customers wait several generations of new releases before upgrading. Generally, customers are concerned that upgrading their operating system immediately after a new release is made available will lead to breakage because of incompatibility between preexisting applications and a newer operating system. Indeed, delay or no delay, customers are still required to allocate considerable resources to test all of the possible compatibility issues. Often, resolving compatibility issues means installing the newly released version of the operating system on a separate computer system and, in many cases, manually conducting test cases to make sure applications work correctly with the newer version of the operating system. Testing becomes increasingly complex in systems with multiple interdependent software applications.

Technology companies in the business of developing operating systems are also significantly impacted. These companies typically expend considerable resources to support older operating system versions. For example, support center engineers are required to understand the functionality associated with each new release. In addition, code fixes that affect all released versions of a software product requires that the company package, build, and distribute the code fixes to customers for all supported releases. These challenges are compounded as the technology company continues to support an ever increasing number of older operating system releases.

Thus, it would be useful to have a technology that anticipates potential problems associated with an operating system upgrade. Indeed, any computer system software with multiple interdependencies would benefit from such a technology. A technology is needed that assists in testing the compatibility of a new operating system version release with preexisting applications by identifying potential problems before executing an upgrade.

SUMMARY OF THE INVENTION

The present invention monitors usage of an operating system at an application program interface ("API") level and monitors changes in API functionality associated with an upcoming release to manage the version change process. A computer system is configured to track a collection of API functions associated with a first version operating system currently installed and to record the subset of API functions that have been called by applications during operation of the first version operating system. The computer system is further configured to manage the subset of API functions and generate a comparison between the subset and a list of API functions that have changed between a second version and the first version operating system. Finally, the computer system is configured to report the result of the comparison back to the user.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2C illustrates API comparison report configured to display API overlap detail in the form of a sortable list including called API functions and changed API functions.

DETAILED DESCRIPTION OF THE PREFERRED EMBODIMENTS

In the following detailed description of embodiments of the invention, reference is made to the accompanying drawings, which form a part hereof, and within which are shown by way of illustration specific embodiments by which the invention may be practiced. It is to be understood that other embodiments may be utilized and changes may be made without departing from the scope of the invention.

Generally, operating systems provide a set of services to applications for executing a broad range of functions. For example, an application can open windows, files, and message boxes and perform more complicated tasks by passing instructions to the operating system. The interface for having the operating system perform the services is often referred to as the application program interface ("API"). Those of ordinary skill in the art will appreciate that, alternatively, the labels "system calls" and "library calls" are also used along with the API label to describe the mechanisms through which software programs access the services of an operating system. Further, those of ordinary skill in the art will appreciate that APIs are used in varying types of software applications in addition to operating systems allowing for interdependencies between different software applications on a computer system. Although this specification uses the terms "operating system" and "API" for ease of explanation, the present invention applies to all software programs including operating systems and other applications that make services available to other software programs.

Figure 1:
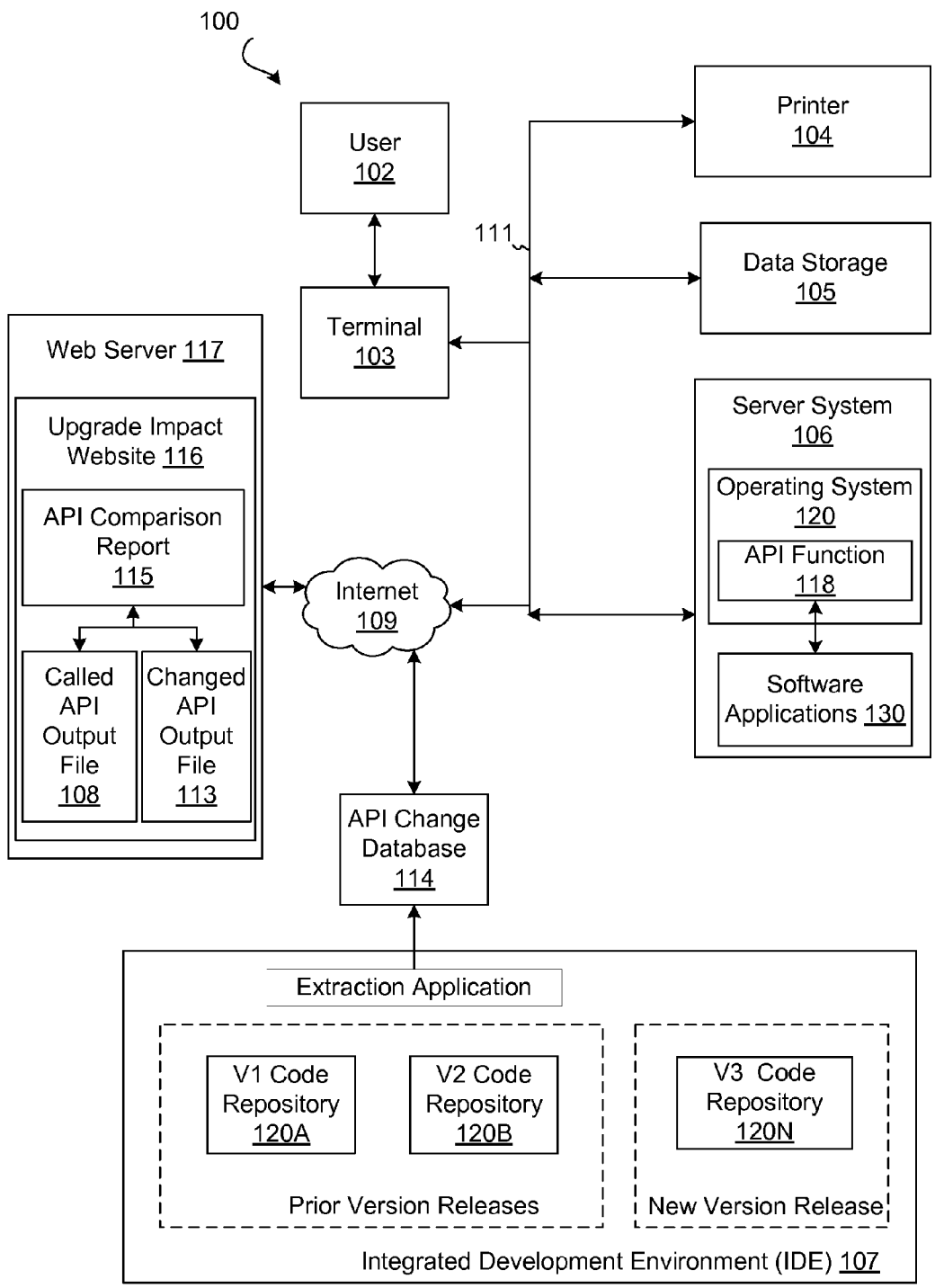
FIG. 1 illustrates an embodiment of a system that analyzes the usage of APIs in an operating system and predicts potential problems in the upgrade process.

FIG. 1 illustrates a high level embodiment of a system that analyzes the usage of APIs in an operating system and predicts potential problems in the upgrade process 100. Illustrated is a server system 106, a data storage device 105, an output device for the server system 106 in the form of a printer 104, an input/output device for the server system 106 in the form of a computer terminal 103, and a connection to the internet 109.

The computer terminal 103 is coupled to the printer 104, the data storage device 105, and the server system 106 via a communication network 111. Many other devices or subsystems may be connected in a similar manner. Also, it is not necessary for all the devices shown in FIG. 1 to be present to practice the present invention. The invention may be practiced on a personal computer system or mainframe computer system among others. The invention may also be implemented as a computer program embedded in a computer readable storage medium (e.g., a non-transitory computer readable storage medium, such as the storage device 105) and capable of being executed by a computer processor for electronic data interchange, the executed computer program causing the computer to perform various steps (e.g., blocks 501-511 of the computer-implemented method 500, described below with reference to FIG. 5).

An operating system 120 residing within the server system 106 is configured to monitor the use of its services accessed via an API function 118 by software applications 130 running on the server system 106. In an alternative embodiment (not illustrated), a special software application separate from the operating system 120 is configured to function as a broker between software applications 130 and the operating system 120 so as to monitor the use of the API functions 118.

Each API function 118 may include a 'requester' parameter, wherein the value of the 'requester' parameter is the name of the software application 130 that makes use of the API function 118. The operating system is configured to record the value of the 'requestor' parameter along with the name of the API function 118 utilized by the software application 130. The API function use information is tracked internally within the server system 106 before being written to a called API output file 108. The called API output file 108 comprises a list of API functions 118 utilized by software applications 130 (hereinafter "called API functions") and a list of associated names of the software applications 130 that called the API functions 118 as provided by the 'requestor' parameter.

The called API output file 108 may also include a frequency count, wherein the frequency count is an indication of the number of times that a particular software application made use of a particular API function. In other words, a software application that makes use of an API function a total number of Y times within its operation cycle will have a frequency count of Y. The operating system 120 may be configured to output the called API output file 108 at the request of a user 102 or may be configured to output the called API output file 108 periodically based on predefined settings.

The operating system 120 is further configured to upload the called API output file 108 to an upgrade impact website 116 via the Internet 109 at the request of the user 102. In an alternative embodiment, the operating system 120 is configured to upload the called API output file 108 automatically after a new release version of the operating system 120 becomes available and after the list of called API functions is compiled in the called API output file 108.

The API change database 114 is configured to track the changes in API functionality between a new version release 120N of the operating system 120 and prior version releases 120A and 120B of the operating system 120. In one embodiment, a list of changed API functions is output to the API change database 114 by an extraction application within an integrated development environment (IDE) 107 used to create the new version release 112. In particular, at compilation time, the IDE 107 used to create the new version release 112 is configured to perform a line-by-line code comparison between the new version release 112 and the prior version releases 110 of each of the API functions in the operating system. The IDE 107 is configured to separately categorize API code changes between different operating system versions. For example, the list of changed API functions identified in the comparison between the V3 code repository 120N and a V1 code repository 120A is separately categorized from the list of changed API functions identified in the comparison between the V3 code repository 120N and a V2 code repository 120B to accommodate users interested in upgrading from different operating system versions.

The API change database 114 takes as input the result of the comparison. In an alternative embodiment (not illustrated), a special software application that is separate from the IDE 107 may be configured to do a line-by-line code comparison of each of the API functions between the various operating system versions. The API change database 114 is configured to upload the changed API output file 113 to the upgrade impact website 116 via the Internet 109.

The upgrade impact website 116 is maintained on a web server 117 (e.g., a server computer system and/or software application configured to deliver web content that can be accessed through the Internet) and is configured to display to the user an API comparison report 115 which in turn is configured to compare the called API output file 108 to the changed API output file 113 and to display overlapping API functions 118. The upgrade impact website 116 may be configured to maintain the API comparison report 115 temporarily, such as for the duration a user's visit to the upgrade impact website 116. Alternatively, the upgrade impact website may be configured to store each user's API comparison report 115.

Figure 2A:
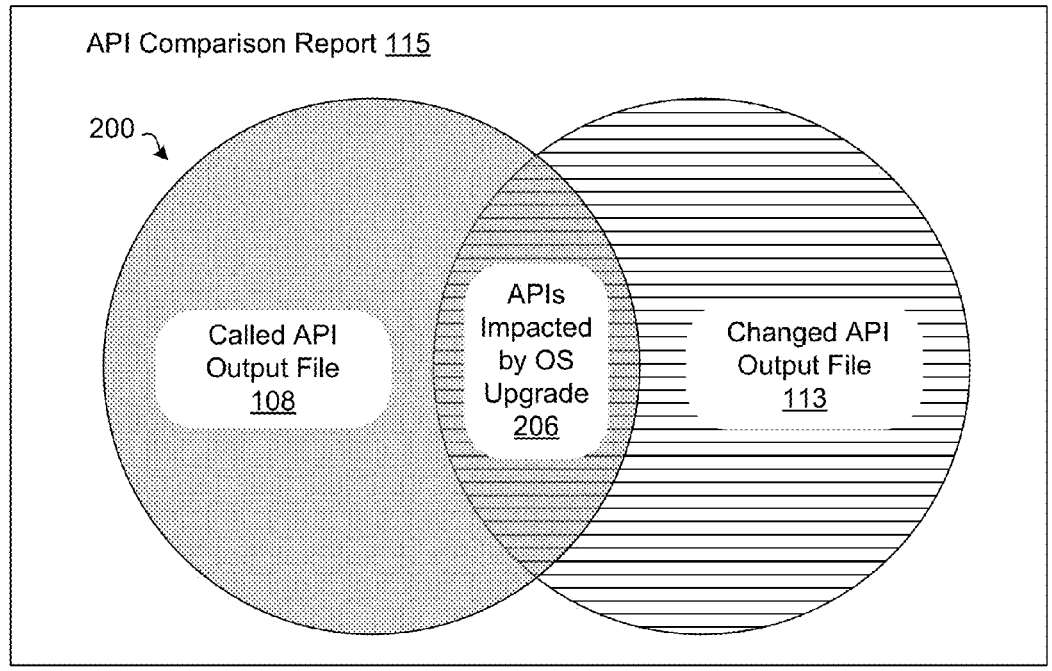
FIG. 2A illustrates an API comparison report configured to display the impact of an operating system upgrade by showing the overlap between called API functions and changed API functions.
Figure 2B:
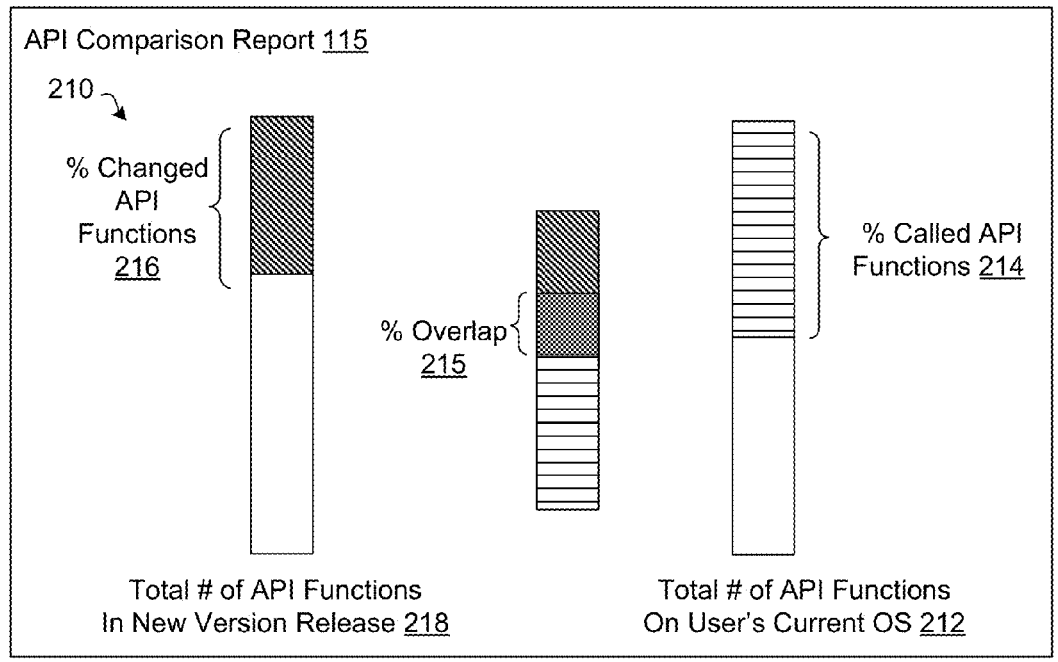
FIG. 2B illustrates an API comparison report configured to display the impact of an operating system upgrade in the form of two bar graphs.

The API comparison report 115 is explained now in more detail as illustrated in FIGS. 2A, 2B, and 2C with additional reference to the embodiment above.

Referring to FIG. 2A, the API comparison report 115 is configured to display to the user detail regarding the impact of an operating system (OS) upgrade 204 based on the overlap between the called API output file 108 and the changed API file 113. In one embodiment the APIs impacted by the upgrade 206 may be displayed to the user in the form of a Venn diagram 200. The subset of APIs functions that overlap between the two lists may appear as a total number of impacted APIs or as a percentage, wherein the percentage is the number of APIs affected in the called API output file 108 divided by the total number operating system API functions.

In another embodiment, as shown in FIG. 2B, the API comparison report 115 may also display the impact of an OS upgrade in the form of one or more bar graphs 210. In the illustrated embodiment, the API comparison report 115 is configured to display a percentage of changed API functions 216, wherein the percentage of changed API functions 216 equals the number of APIs that have changed between the new version OS release and the previous version OS release divided by the total number of API functions in the new version OS release 218. An additional bar graph may also show a percentage of called API functions 214, wherein the percentage of called API functions 214 equals the number of API functions that have been called divided by the total number of API functions on the user's current operating system 212. The API comparison report 115 may also be configured to display to the user a percentage overlap 215, wherein the percentage overlap 215 equals the number of called API functions 214 that match the changed API functions 216 divided by the number of called API functions.

In another embodiment, as shown in FIG. 2C, the API comparison report 115 may also be configured to display to the user an API overlap subset 220 in the form of a sortable list 225 indicating the API functions that appear both on the list of called API functions 202 of FIG. 2A and the list of changed API functions 204 of FIG. 2A. The sortable list 225 includes the names of the called API functions in the operating system and the associated software applications that made use of the API functions. The sortable list may also include the frequency with which each of the software applications makes use of the API functions within a period of operation. The API comparison report 115 may also be configured to give the user the ability to sort the API overlap subset 220 by API function or by software application 230. In an alternative embodiment, the sortable list 225 may also include descriptions for each of the API functions.

In another embodiment (not illustrated), the API comparison report 115 may also be configured to display to the user an upgrade risk level indicating to the user the likelihood of software application breakage based on the number of API functions and the frequency with which the API functions are used by the software applications that would be impacted if the operating system were upgraded. The upgrade risk level may be displayed to the user in the form of a color indicator. For example, the risk level may display as red (high risk) if a software application makes use of a plurality of API functions impacted by an upgrade, each of which has a high frequency of use. In contrast, if a software program only makes use of one API function which is infrequently used, the risk level may appear to the user as green (low risk).

Thus, if a software application uses 10% of the available operating system API functions and uses each more than 50% of the time during a period of operation then a change to the API function may be flagged as high risk and handled accordingly. The threshold percentages may be established by the user. Alternatively, the threshold for high risk and low risk may be handled by the developer of the software application. Further, the developer of the software application may indicate the importance of the API functions utilized by the software application. For example, the developer may include a weighting for each API function utilized, wherein a larger weighting signifies that a particular API function is more important to the overall operation of the software application. The developer may provide the threshold and the weighting in a formatted file that is read during the software application installation.

In another embodiment, the OS 120 may be configured to automatically perform an OS upgrade based on the assessed risk level. For example, the user's OS 120 may be configured to automatically upgrade if the risk level is determined to be low. Alternatively, the system may prevent an upgrade if the risk level is determined to be high. In the latter scenario, additional verification may be required before the user 102 can override the system setting and upgrade the OS 120.

The API comparison report 115 of FIG. 1 may be configured to provide a user with a plurality of options for selectively displaying the result of the API comparison including the embodiments described above among others. Those of ordinary skill in the art will appreciate the different techniques for displaying such information in addition to the embodiments described above.

Figure 3:
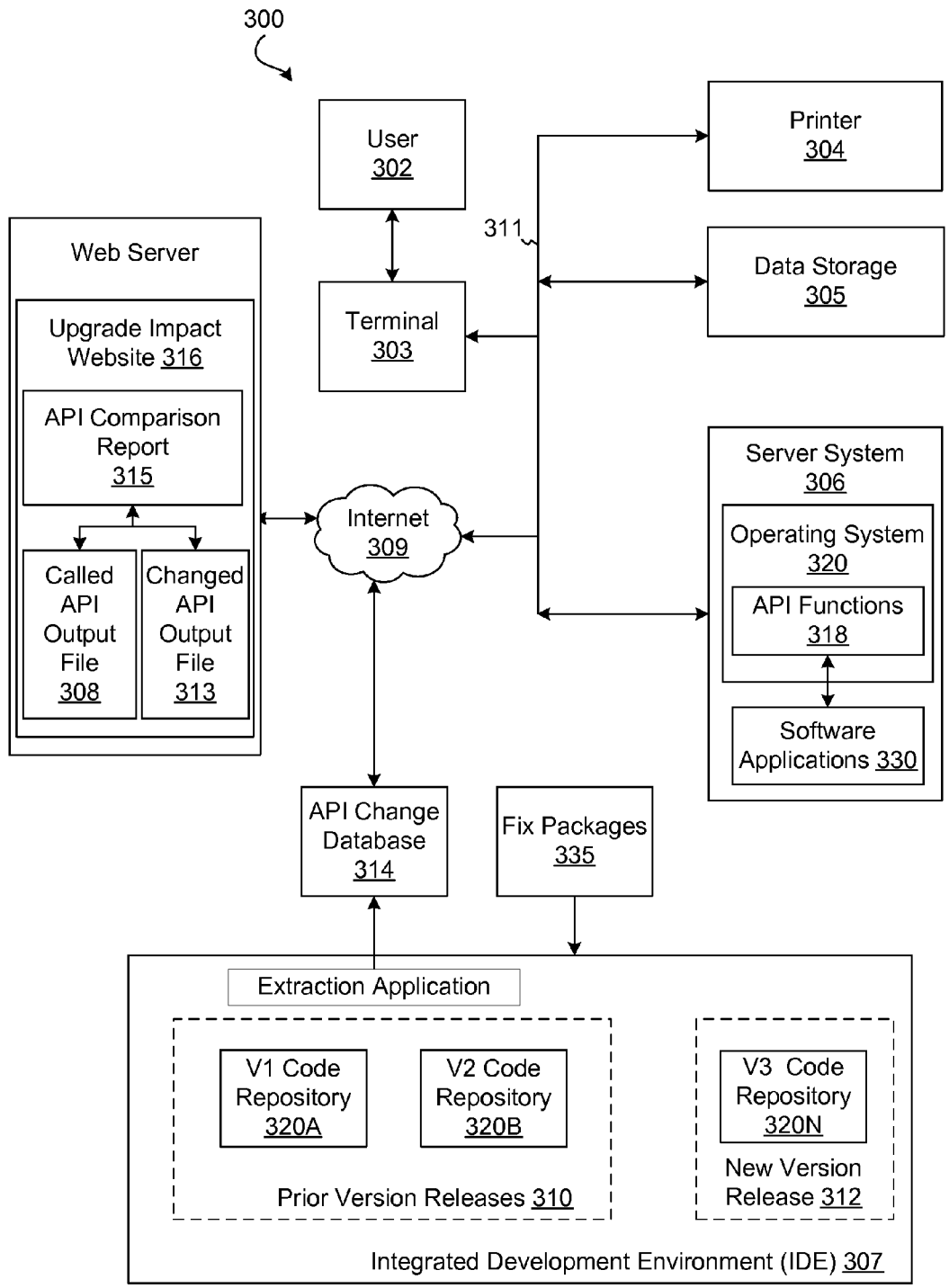
FIG. 3 illustrates an alternative embodiment of the system illustrated in FIG. 1 wherein the system is further configured to predict potential fix package installation problems in addition to potential operating system upgrade problems.

FIG. 3 shows an alternative embodiment of the system illustrated in FIG. 1 that accounts for potential fix package installation problems in addition to potential operating system upgrade problems. A fix package is a temporary solution or by-pass of a problem associated with a defect in a current release of a software program.

The system 300 shown in FIG. 3 operates similarly to the embodiment of FIG. 1 in that the computer terminal 303 is coupled to the printer 304, the data storage device 305, and a server system 306 via a communication network 311. Further, an operating system 320 is configured to monitor the use of its services accessed via an API function 318 by software applications 330 running on the server system 306.

In addition to the functionality described in FIG. 1, the IDE 307 of FIG. 3 is configured to identify the changes to the operating system API functions that are caused by fix packages 335. In particular, the IDE 307 may compare the API function code of each of the operating system version releases to API function code referenced in each of the fix packages 335. In another embodiment, the IDE 307 may also keep an inventory of the names of all operating system API functions to expedite the identification of API functions in each of the fix packages 335.

In an alternative embodiment (not illustrated), as noted above, a software program independent from the IDE 307 may be configured to identify the changes to the operating system API functions that are caused by fix packages 335. The software program may also keep an inventory of all operating system API functions for expedited identification of API functions in each of the fix packages.

An extraction application within the IDE 307 outputs the results to the API change database 314. Thus, the API change database 314 is configured to keep record of API function changes due to fix packages 335 as well as the API function changes between a new version release 312 and prior version releases 310 of the operating system 320. A V1 code repository 320A, a V2 code repository 320B, and a V3 code repository 320N shown in FIG. 3 generally correspond to, respectively, the V1 code repository 120A, the V2 code repository 120B, and the V3 code repository 120N shown in FIG. 1.

Similar to the embodiment described in FIG. 1, the API change database 314 of FIG. 3 is configured to upload the changed API output file 313 to the upgrade impact website 316 via the Internet 309. The upgrade impact website 316 is configured to display to a user 302 an API comparison report 315 with similar functionality to the embodiments described in FIGS. 1, 2A, 2B, and 2C.

In another embodiment (not illustrated), the API comparison report 315 may also be configured to display to the user 302 an API quality metric based on the number of fix packages that impact each of the API functions listed in the called API output file 308. If the code associated with an API function has changed with multiple or successive fix package releases, the API quality metric will be low indicating to the user that the API function is of higher risk and as a result of lower quality.

The API comparison report 315 may also be configured to display to the user a fix package risk level that indicates to the user the likelihood of breakage associated with the installation of a fix package. A list of changed API functions caused by a fix package is compared with the list of called API functions provided in the called API output file 308. The API functions that appear in both lists are displayed to the user along with a fix package risk level to be handled by the system or by the user accordingly. The risk level may be displayed to the user in the form of a color indicator. For example, the fix package risk level may display as red (high risk) if a software application 330 impacted by a fix package makes use of a plurality of API functions, each of which has a high frequency of use. In contrast, if a software program only makes use of one API function which is infrequently used, the fix package risk level may appear to the user as green (low risk).

Figure 4:
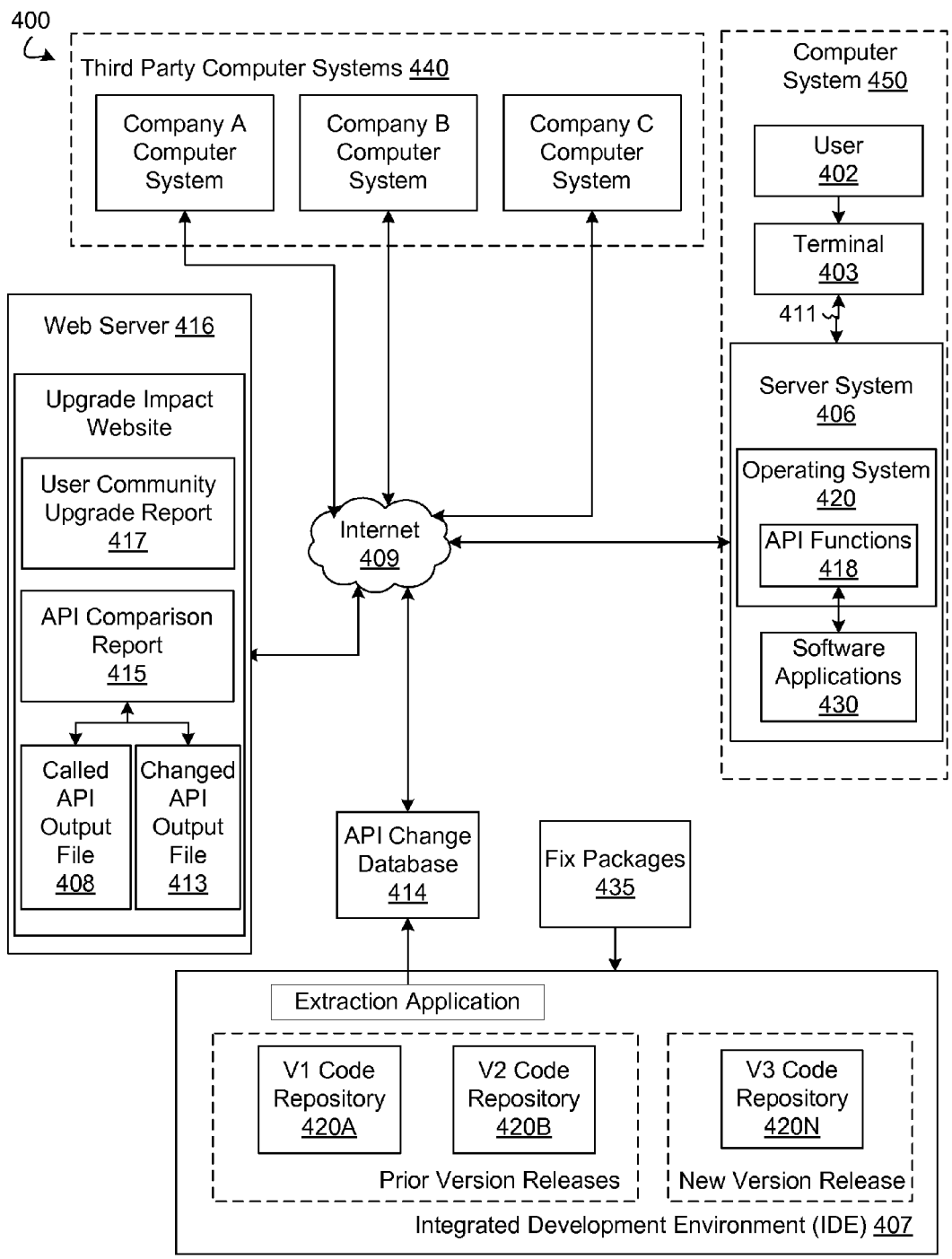
FIG. 4 illustrates an alternative embodiment of the system illustrated in FIG. 3 wherein the system is further configured to take input from third party computer systems for upgrade comparison.

FIG. 4 illustrates an alternative embodiment of the system illustrated in FIG. 3 for analyzing the usage of APIs on a plurality of third party systems as well as the user system and predicting problems in the upgrade process based on the collective API usage information of all systems. For example, in this embodiment, the system 400 may analyze the API usage characteristics of a particular software application installed on a third party system, but not currently installed on the user's system, and display to the user an associated risk level for the particular software application to predict problems associated with introducing new software applications or upgrading the operating system.

In particular, the web server 416 of FIG. 4 takes inputs from third party computer systems 440 in addition the user's computer system 450. Each of the plurality of third party computer systems 440 includes an OS configured to provide the upgrade impact website with the respective OS version, API usage characteristics for the system, including the names of the APIs and the calling software applications, a list of currently installed fix packages, and problems encountered on each third party computer system.

In an alternative embodiment (not illustrated), the web server 416 is configured to take input from a third party source that aggregates and maintains computer system details for a plurality of third party computer systems 440, wherein the computer system details include the OS version, API usage characteristics for the system, including the names of the APIs and the calling software applications fix package status, and a description of problems encountered among other data. For example, a customer support center may maintain a customer inventory system that includes the computer system details described above and may have the customer inventory system configured to periodically output the data to the web server 416.

The web server 416 is configured to display a user community upgrade report 417. The user community upgrade report 417 is configured to compile a list of third party computer systems 440 that have similar computer systems as the user 402, wherein a similar computer system is defined as a computer system that has the same OS 420 as the user 402 OS. The user community upgrade report 417 is configured to display that list to the user 402. The user community upgrade report 417 also includes the percentage of third party user's from the compiled list that have upgraded their OS and the percentage that have installed the latest fix packages. The user community upgrade report 417 may also include the names of the called API functions on the third party computer systems 440 in the operating system and the associated software applications that made use of the API functions. Further, the user community upgrade report 417 may also include a description of problems encountered by third party users associated with changes in API functions due to fix installation and OS upgrades.

Other aspects of the embodiment shown in FIG. 4 operate similarly to the embodiment of FIG. 3 in that the computer terminal 403 is coupled to a server system 406 via a communication network 411. One of ordinary skill in the art will appreciate that other devices may also be connected to the communication network 411. Further, an OS 420 is configured to monitor the use of its services accessed via API functions 418 by software applications 430, to compile a list of called API functions, and to upload the API output file 408 to the web server 416 via the Internet 409.

In an alternative embodiment (not illustrated), the OS 420 may also be configured to automatically install fix packages and perform OS upgrades based on user provided criteria. The criteria may include the percentage of total users with similar computer systems that have upgraded their OS, the percentage of users with similar computer systems that have installed a fix package, and the percentage of API functions that are in use by software applications 430 that would be impacted by an upgrade or installation. In an alternative embodiment, the OS may also be configured to automatically install fix packages and perform OS upgrades based on a recommended date of a third party.

As noted above, other aspects of the embodiment shown in FIG. 4 operate similarly to the embodiment of FIG. 3. For example, an integrated development environment (IDE) 407 shown in FIG. 4 generally corresponds to the IDE 307 shown in FIG. 3. Similarly, a changed API output file 413, a API change database 414, and an API comparison report 415 shown in FIG. 4 generally corresponds to, respectively, the changed API output file 313, the API change database 314, and the API comparison report 315 shown in FIG. 3. Also, a V1 code repository 420A, a V2 code repository 420B, and a V3 code repository 420N shown in FIG. 4 generally correspond to, respectively, the V1 code repository 320A, the V2 code repository 320B, and the V3 code repository 320N shown in FIG. 3. In addition, fix packages 435 shown in FIG. 4 generally correspond to the fix packages 335 shown in FIG. 3.

Figure 5:
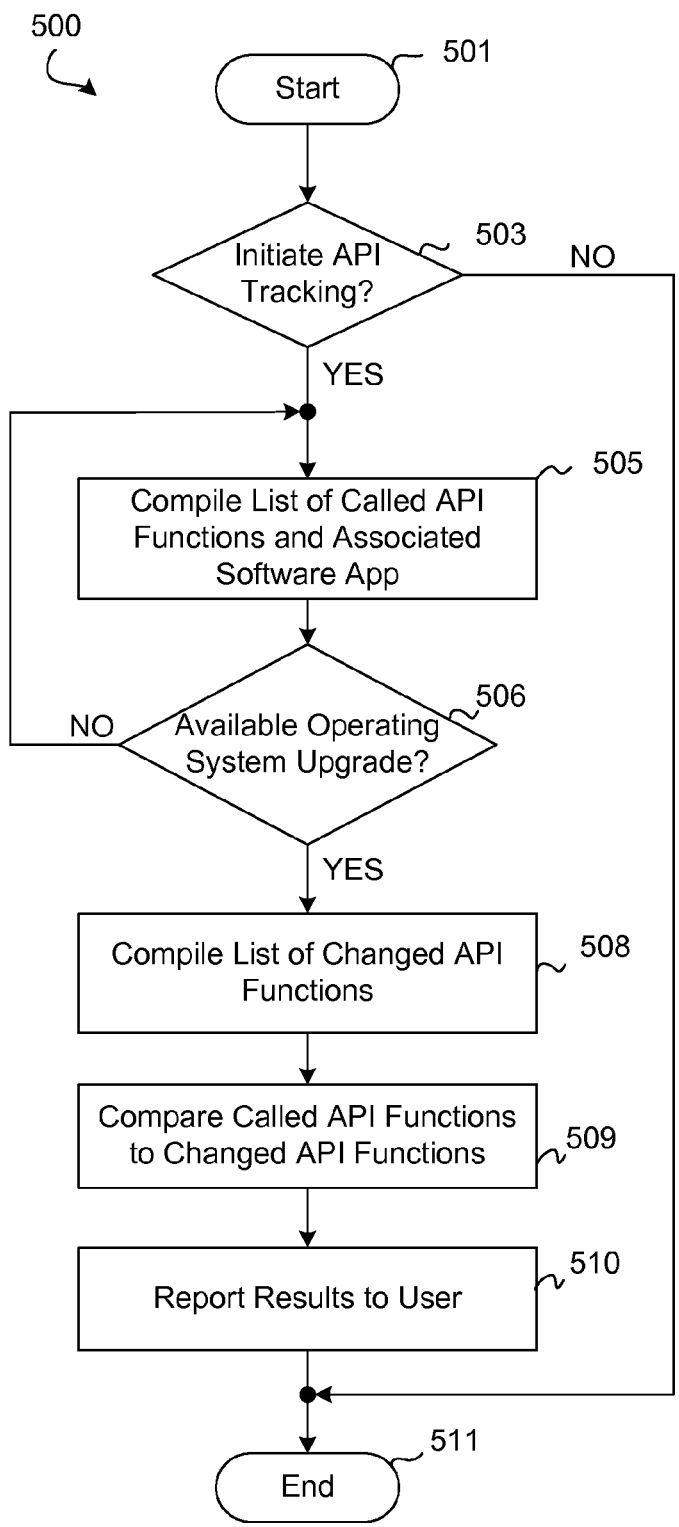
FIG. 5 illustrates a flowchart of a method embodiment of the invention.

Referring to FIG. 5, a method embodiment of the invention is shown. Method 500 begins at block 501. If, as determined at decision block 503, the user initiates API tracking the process continues to block 505. If the user does not initiate API tracking 503 the process ends, at block 511.

At block 505, the OS compiles a list of called API functions and the associated software applications that made use of the API functions and creates an output file. If, as determined at decision block 506, an OS upgrade is available, an API change database creates a list of changed API functions, at block 508. The list is a compilation of API functions that have changed between a prior version release of an OS and a new version release, the prior version release being the OS version currently deployed on the user's server. Then, the list of called API functions is compared to the list of changed API functions, at block 509. Finally, the result of the comparison is reported to the user, at block 510 and the process ends at 511.

Those of ordinary skill in the art will appreciate that the embodiments described above for predicting problems with software upgrades can be combined with other techniques for testing software upgrade compatibility. For example, some embodiments may include functionality that tests for breakage after installation of a new version of software, such as that described in U.S. Pat. No. 6,591,417, which is herein incorporated by reference in its entirety.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Therefore, it is desired that the embodiments described herein be considered in all respects as illustrative, not restrictive, and that reference be made to the appended claims for determining the scope of the invention.

What is claimed is:

1. A computer-implemented method of predicting problems with a versioning change to an operating system, the method comprising:

tracking a plurality of application program interface (API) functions in a first version of an operating system currently installed;
recording a called subset of the plurality of API functions, wherein the called subset comprises API functions that are called by a software application during operation of the first version of the operating system;
recording a changed subset of the plurality of API functions, wherein the changed subset comprises API functions that have changed between a second version of the operating system and the first version of the operating system;
generating a result from a comparison between the called subset and the changed subset;
providing a user with a plurality of options for selectively displaying the result of the comparison including selectively displaying the result to the user in the form of a Venn diagram, a bar graph, and a sortable list; and
selectively displaying the result of the comparison to the user in the form of an API comparison report that includes at least one of the Venn diagram, the bar graph, and the sortable list;
  wherein the Venn diagram, if included in the API comparison report, comprises a first set representing the called subset, a second set representing the changed subset, and an intersection of the first set and the second set representing an APIs impacted subset, wherein the APIs impacted subset comprises API functions that overlap between the called subset and the changed subset;
  wherein the bar graph, if included in the API comparison report, comprises a first bar graph representing the called subset as a percentage of a total number of API functions in the first version of the operating system, a second bar graph representing the changed subset as a percentage of a total number of API functions in the second version of the operating system, and a third bar graph representing an overlap subset as a percentage of a total number of API functions of the called subset, wherein the overlap subset comprises a subset of API functions that overlap between the called subset and the changed subset;
  wherein the sortable list, if included in the API comparison report, comprises (i) a name of each API function in an API overlap subset, wherein the API overlap subset comprises a subset of API functions that overlap between the called subset and the changed subset and (ii) a name of each software application calling one or more API functions of the API overlap subset, and wherein the sortable list is sortable by (i) the name of the API function and (ii) the name of the software application.

2. The method of claim 1, wherein the plurality of API functions each comprise a requestor parameter, wherein the requestor parameter takes as input a name of a calling software application.

3. The method of claim 2, wherein API comparison report is configured to give the user the ability to sort an API overlap subset by the API functions or by the software application.

4. The method of claim 2, wherein the API comparison report includes an upgrade risk level, wherein the upgrade risk level indicates a likelihood of software application breakage and wherein the upgrade risk level is determined by an extent of API usage and a frequency of API usage in an API overlap subset, wherein the API overlap subset comprises a subset of API functions that overlap between the called subset and the changed subset.

5. The method of claim 4, further comprising upgrading the first version of the operating system to the second version of the operating system automatically if the upgrade risk level is below an established threshold.

6. A computer program embedded in a non-transitory computer readable storage medium and capable of being executed by a computer processor for electronic data interchange, the executed computer program causing the computer to perform the steps comprising:
tracking a plurality of application program interface (API) functions in a first version of an operating system currently installed;
recording a called subset of the plurality of API functions, wherein the called subset comprises API functions that are called by a software application during operation of the first version of the operating system;
recording a changed subset of the plurality of API functions, wherein the changed subset comprises API functions that have changed between a second version of the operating system and the first version of the operating system;
generating a result from a comparison between the called subset and the changed subset;
providing a user with a plurality of options for selectively displaying the result of the comparison including selectively displaying the result to the user in the form of a Venn diagram, a bar graph, and a sortable list; and
selectively displaying the result of the comparison to the user in the form of an API comparison report that includes at least one of the Venn diagram, the bar graph, and the sortable list;
  wherein the Venn diagram, if included in the API comparison report, comprises a first set representing the called subset, a second set representing the changed subset, and an intersection of the first set and the second set representing an APIs impacted subset, wherein the APIs impacted subset comprises API functions that overlap between the called subset and the changed subset;
  wherein the bar graph, if included in the API comparison report, comprises a first bar graph representing the called subset as a percentage of a total number of API functions in the first version of the operating system, a second bar graph representing the changed subset as a percentage of a total number of API functions in the second version of the operating system, and a third bar graph representing an overlap subset as a percentage of a total number of API functions of the called subset, wherein the overlap subset comprises a subset of API functions that overlap between the called subset and the changed subset;
  wherein the sortable list, if included in the API comparison report, comprises (i) a name of each API function in an API overlap subset, wherein the API overlap subset comprises a subset of API functions that overlap between the called subset and the changed subset and (ii) a name of each software application calling one or more API functions of the API overlap subset, and wherein the sortable list is sortable by (i) the name of the API function and (ii) the name of the software application.

7. A system for predicting problems with a versioning change to an operating system, comprising:
a first special software application configured to track a plurality of application program interface (API) functions in a first version of an operating system currently installed;

wherein the first special software application is further configured to record a called subset of the plurality of API functions, wherein the called subset comprises API functions that are called by a software application during operation of the first version of the operating system;

a second special software application configured to compare API function code between a second version of the operating system and the first version of the operating system;

wherein the second special software application is further configured to record a changed subset of the plurality of API functions, wherein the changed subset comprises API functions that have changed between the second version of the operating system and the first version of the operating system; and a server computer system comprising a processor and communicatively coupled to the first special software application and the second special software application and configured to generate a result from comparing the called subset to the changed subset, to provide a user with a plurality of options for selectively displaying the result of the comparison including selectively displaying the result to the user in the form of a Venn diagram, a bar graph, and a sortable list, and to selectively display the result to the user in the form of an API comparison report that includes at least one of the Venn diagram, the bar graph, and the sortable list;

wherein the Venn diagram, if included in the API comparison report, comprises a first set representing the called subset, a second set representing the changed subset, and an intersection of the first set and the second set representing an APIs impacted subset, wherein the APIs impacted subset comprises API functions that overlap between the called subset and the changed subset;

wherein the bar graph, if included in the API comparison report, comprises a first bar graph representing the called subset as a percentage of a total number of API functions in the first version of the operating system, a second bar graph representing the changed subset as a percentage of a total number of API functions in the second version of the operating system, and a third bar graph representing an overlap subset as a percentage of a total number of API functions of the called subset, wherein the overlap subset comprises a subset of API functions that overlap between the called subset and the changed subset;

wherein the sortable list, if included in the API comparison report, comprises (i) a name of each API function in an API overlap subset, wherein the API overlap subset comprises a subset of API functions that overlap between the called subset and the changed subset and (ii) a name of each software application calling one or more API functions of the API overlap subset, and wherein the sortable list is sortable by (i) the name of the API function and (ii) the name of the software application.

8. The system of claim 7, wherein the plurality of API functions each comprise a requestor parameter, wherein the requestor parameter takes as input a name of a calling software application.

9. The system of claim 8, wherein the API comparison report is configured to give the user the ability to sort an API overlap subset by the API functions or by the software application.

10. The system of claim 7, wherein the first special software application is further configured to maintain a frequency count, wherein the frequency count records the number of times that each of the plurality of API functions is called during operation of the first version of the operating system.

11. The system of claim 10, wherein the API comparison report includes the frequency count for each API function of the called subset that overlaps with the changed subset.

12. The system of claim 7, wherein the API comparison report includes an upgrade risk level, wherein the upgrade risk level indicates a likelihood of software application breakage and wherein the upgrade risk level is determined by an extent of API usage and a frequency of API usage in an API overlap subset, wherein the API overlap subset comprises a subset of API functions that overlap between the called subset and the changed subset.

13. The system of claim 12, wherein the first version of the operating system automatically upgrades to the second version of the operating system if the upgrade risk level is below an established threshold.

14. The system of claim 7, wherein the second special software application is configured to output the result of the comparison between the second version of the operating system and the first version of the operating system when the second version of the operating system is compiled.

15. The system of claim 7, wherein the first special software application is further configured to upload the called API functions to the server computer system at the user's request.

16. The system of claim 7, wherein the first special software application is further configured to upload the called subset to the server computer system when a new version of the operating system is released.

17. The system of claim 7, wherein the first special software application is a component of the first version of the operating system.

18. The system of claim 7, wherein the changed subset further comprises API functions that have changed in the first version of the operating system as a result of a fix package.

19. The system of claim 18, wherein the API comparison report further comprises an API quality metric, wherein the API quality metric indicates if a given API function is of higher risk because of successive fix package changes.

20. The system of claim 7, wherein the server computer system is further configured to display a user community upgrade report.

21. The system of claim 20, wherein the user community upgrade report is configured to compile a list of similar third party computer systems;

wherein a similar third party computer system is a third party computer system that has the same operating system as the user's operating system.

22. The system of claim 21, wherein the user community upgrade report is further configured to display (i) a percentage of third party computer systems from the list that have upgraded an associated operating system and (ii) a percentage of third party computer systems that have installed the latest fix packages.

* * * * *

UNITED STATES PATENT AND TRADEMARK OFFICE
CERTIFICATE OF CORRECTION

PATENT NO. : 8,423,963 B2
APPLICATION NO. : 12/402826
DATED : April 16, 2013
INVENTOR(S) : Benjamin R. Garbers et al.

It is certified that error appears in the above-identified patent and that said Letters Patent is hereby corrected as shown below:

Title Page: Item (73) Assignee: International Buysiness Machines Corporation, Armonk, NY (US)
should be International Business Machines Corporation, Armonk, NY (US)

Signed and Sealed this
Thirteenth Day of August, 2013

Teresa Stanek Rea
*Acting Director of the United States Patent and Trademark Office*